(12) United States Patent
Wang et al.

(10) Patent No.: US 12,499,348 B2
(45) Date of Patent: Dec. 16, 2025

(54) READ THRESHOLD PREDICTION IN MEMORY DEVICES USING DEEP NEURAL NETWORKS

(71) Applicant: SK hynix Inc., Icheon-si (KR)

(72) Inventors: Haobo Wang, San Jose, CA (US); Aman Bhatia, San Jose, CA (US); Fan Zhang, Fremont, CA (US)

(73) Assignee: SK HYNIX INC., Icheon-si (KR)

( * ) Notice: Subject to any disclaimer, the term of this patent is extended or adjusted under 35 U.S.C. 154(b) by 1044 days.

(21) Appl. No.: 17/544,342

(22) Filed: Dec. 7, 2021

(65) Prior Publication Data

US 2023/0176765 A1    Jun. 8, 2023

(51) Int. Cl.
G06N 3/04    (2023.01)
G06F 3/06    (2006.01)
G06F 12/02   (2006.01)
G06N 3/045   (2023.01)

(52) U.S. Cl.
CPC .......... *G06N 3/045* (2023.01); *G06F 3/0613* (2013.01); *G06F 3/0653* (2013.01); *G06F 3/0679* (2013.01); *G06F 12/0246* (2013.01)

(58) Field of Classification Search
CPC .... G06N 3/045; G06F 12/0246; G06F 3/0679
See application file for complete search history.

(56) References Cited

U.S. PATENT DOCUMENTS

| | | | | |
|---|---|---|---|---|
| 11,775,203 | B2 * | 10/2023 | Seo | G11C 16/0483 711/154 |
| 2020/0107766 | A1 | 4/2020 | Liu et al. | |
| 2020/0160150 | A1 * | 5/2020 | Hashemi | G06F 3/0673 |
| 2022/0027083 | A1 * | 1/2022 | Zuolo | G06F 3/0679 |
| 2022/0214826 | A1 * | 7/2022 | Seo | G06F 3/064 |
| 2022/0293192 | A1 * | 9/2022 | Berman | G06F 3/0604 |

FOREIGN PATENT DOCUMENTS

CN    108777157 B    7/2021

OTHER PUBLICATIONS

NPL Lee Estimation of NAND Flash Memory Threshold V Detection 2013.*
NPL Shi CNN Based Detection for MLC NAND Sep. 2021.*
NPL He ANN Assisted Error Correction for MLC NAND Jul. 2021.*
NPL Chen Voltages prediction algorithm based on LSTM RNN 2020.*
NPL Park Machine learning method to predict threshold voltage distribution 2020.*

* cited by examiner

*Primary Examiner* — Paul M Knight
(74) *Attorney, Agent, or Firm* — Perkins Coie LLP

(57) ABSTRACT

Devices, systems and methods for improving performance of a memory device are described. An example method includes obtaining a plurality of samples corresponding to a probability distribution for each of a plurality of cell voltage distributions of the memory device, each of the plurality of cell voltage distributions corresponding to a read voltage, determining, based on the samples obtained for the plurality of cell voltage distributions, a number of first deep neural networks (DNNs), estimating, for each of the first DNNs, one or more parameters of the corresponding probability distribution based on the plurality of samples, training, based on the samples and the corresponding one or more parameters, each of the first DNNs, and training, based on the samples and the one or more parameters from each of the first DNNs, a second DNN to enable generation of an updated read voltage value for retrieving information from the memory device.

20 Claims, 11 Drawing Sheets

# READ THRESHOLD PREDICTION IN MEMORY DEVICES USING DEEP NEURAL NETWORKS

TECHNICAL FIELD

This patent document generally relates to non-volatile memory devices, and more specifically, to deep neural networks in non-volatile memory devices.

BACKGROUND

Data integrity is an important feature for any data storage device and data transmission. In solid state memory storage (e.g., NAND flash) devices, information is stored in a cell by different charge levels in a cell. During the write and read process, noise is introduced by program disturb and inter-cell interference charge leakage that causes the voltage level to drop over time, where the drop is proportional to the amount of charge stored as well as the number of program and erase (P/E) cycles a cell has experienced. Accounting for the voltage drop when determining the read voltage thresholds increases the longevity of memory devices.

SUMMARY

Embodiments of the disclosed technology relate to methods, systems and devices that improve performance of a block of a memory device. In an example, the performance of the memory device is improved by using a set of first deep neural networks (DNNs), each of which is configured to estimate the parameters of a distinct program voltage (PV) distribution, and a second DNN that is configured to integrate the sets of estimated parameters from each of the set of first DNNS, and output an optimized read voltage thresholds that account for the degradation of the memory cells, thereby enabling the robust retrieval of information from various types of memory devices over the entire lifespan.

In one example, a method for improving performance of a memory device is described. The method includes obtaining a plurality of samples corresponding to a probability distribution for each of a plurality of cell voltage distributions of the memory device, wherein each of the plurality of cell voltage distributions corresponds to a read voltage, determining, based on the samples obtained for the plurality of cell voltage distributions, a number of a plurality of first deep neural networks (DNNs), estimating, for each of the plurality of first DNNs, one or more parameters of the corresponding probability distribution based on the plurality of samples, training, based on the samples and the corresponding one or more parameters, each of the plurality of first DNNs, and training, based on the samples and the one or more parameters from each of the plurality of first DNNs, a second DNN to enable generation of an updated read voltage value for retrieving information from the memory device.

In another example, a method for improving performance of a memory device is described. The method includes obtaining samples corresponding to a plurality of probability distributions, wherein each of the plurality of probability distributions is associated with each of a plurality of cell voltage distributions of the memory device, and wherein each of the plurality of cell voltage distributions corresponds to a read voltage, estimating, for each of a plurality of first deep neural networks (DNNs) associated with a corresponding probability distribution, one or more parameters of the corresponding probability distribution based on the samples, each of the first DNNs having been trained using the samples obtained from the corresponding probability distribution, determining an updated read voltage based on an output of a second DNN, an input to the second DNN comprising the one or more parameters from each of the plurality of first DNNs, and the second DNN having been trained using the samples and the one or more parameters from each of the plurality of first DNNs, and applying the updated read voltage to the memory device to retrieve information from the memory device.

In yet another example, an apparatus for improving performance of a memory device is described. The apparatus includes a memory controller, a plurality of first deep neural networks (DNNs), each first DNN being communicatively coupled to the memory controller, and a second DNN comprising a plurality of inputs, each input being coupled to an output of a corresponding first DNN, and an output coupled to the memory controller, wherein the memory controller is configured to obtain a plurality of samples corresponding to a probability distribution for each of a plurality of cell voltage distributions of the memory device, wherein each of the plurality of cell voltage distributions corresponds to a read voltage, determine, based on the samples obtained for the plurality of cell voltage distributions, a number of a plurality of first deep neural networks (DNNs), estimate, for each of the plurality of first DNNs, one or more parameters of the corresponding probability distribution based on the plurality of samples, train, based on the samples and the corresponding one or more parameters, each of the plurality of first DNNs, and train, based on the samples and the one or more parameters from each of the plurality of first DNNs, a second DNN to enable generation of an updated read voltage value for retrieving information from the memory device.

In yet another example, an apparatus for improving performance of a memory device is described. The apparatus includes a memory controller, a plurality of first deep neural networks (DNNs), each first DNN being communicatively coupled to the memory controller, and a second DNN comprising a plurality of inputs, each input being coupled to an output of a corresponding first DNN, and an output coupled to the memory controller, wherein the memory controller is configured to obtain samples corresponding to a plurality of probability distributions, wherein each of the plurality of probability distributions is associated with each of a plurality of cell voltage distributions of the memory device, and wherein each of the plurality of cell voltage distributions corresponds to a read voltage, estimate, for each of a plurality of first deep neural networks (DNNs) associated with a corresponding probability distribution, one or more parameters of the corresponding probability distribution based on the samples, each of the first DNNs having been trained using the samples obtained from the corresponding probability distribution, determine an updated read voltage based on an output of a second DNN, an input to the second DNN comprising the one or more parameters from each of the plurality of first DNNs, and the second DNN having been trained using the samples and the one or more parameters from each of the plurality of first DNNs, and apply the updated read voltage to the memory device to retrieve information from the memory device.

In yet another example, the methods may be embodied in the form of processor-executable instructions and stored on a computer-readable program medium.

The subject matter described in this patent document can be implemented in specific ways that provide one or more of the following features.

DETAILED DESCRIPTION

Semiconductor memory devices may be volatile or non-volatile. The volatile semiconductor memory devices perform read and write operations at high speeds, while contents stored therein may be lost at power-off. The nonvolatile semiconductor memory devices may retain contents stored therein even at power-off. The nonvolatile semiconductor memory devices may be used to store contents, which must be retained regardless of whether they are powered.

With an increase in a need for a large-capacity memory device, a multi-level cell (MLC) or multi-bit memory device storing multi-bit data per cell is becoming more common. However, memory cells in an MLC non-volatile memory device must have threshold voltages corresponding to four or more discriminable data states in a limited voltage window. For improvement of data integrity in non-volatile memory devices, the levels and distributions of read voltages for discriminating the data states must be adjusted over the lifetime of the memory device to have optimal values during read operations and/or read attempts.

Several methods have been developed to generate optimal read voltages in a non-volatile memory device. Some methods employ a deep neural network (DNN), which is more traditionally used in areas such as computer vision (CV), natural language processing (NLP), robotics and speech. In an example, embodiments of the disclosed technology are directed to an architecture of DNNs that is used by a non-volatile memory system (e.g., as described in FIGS. 1-6), which advantageously reduces the latency and inference time of the DNN.

FIGS. 1-6 overview a non-volatile memory system (e.g., a flash-based memory, NAND flash) in which embodiments of the disclosed technology may be implemented.

Figure 1:
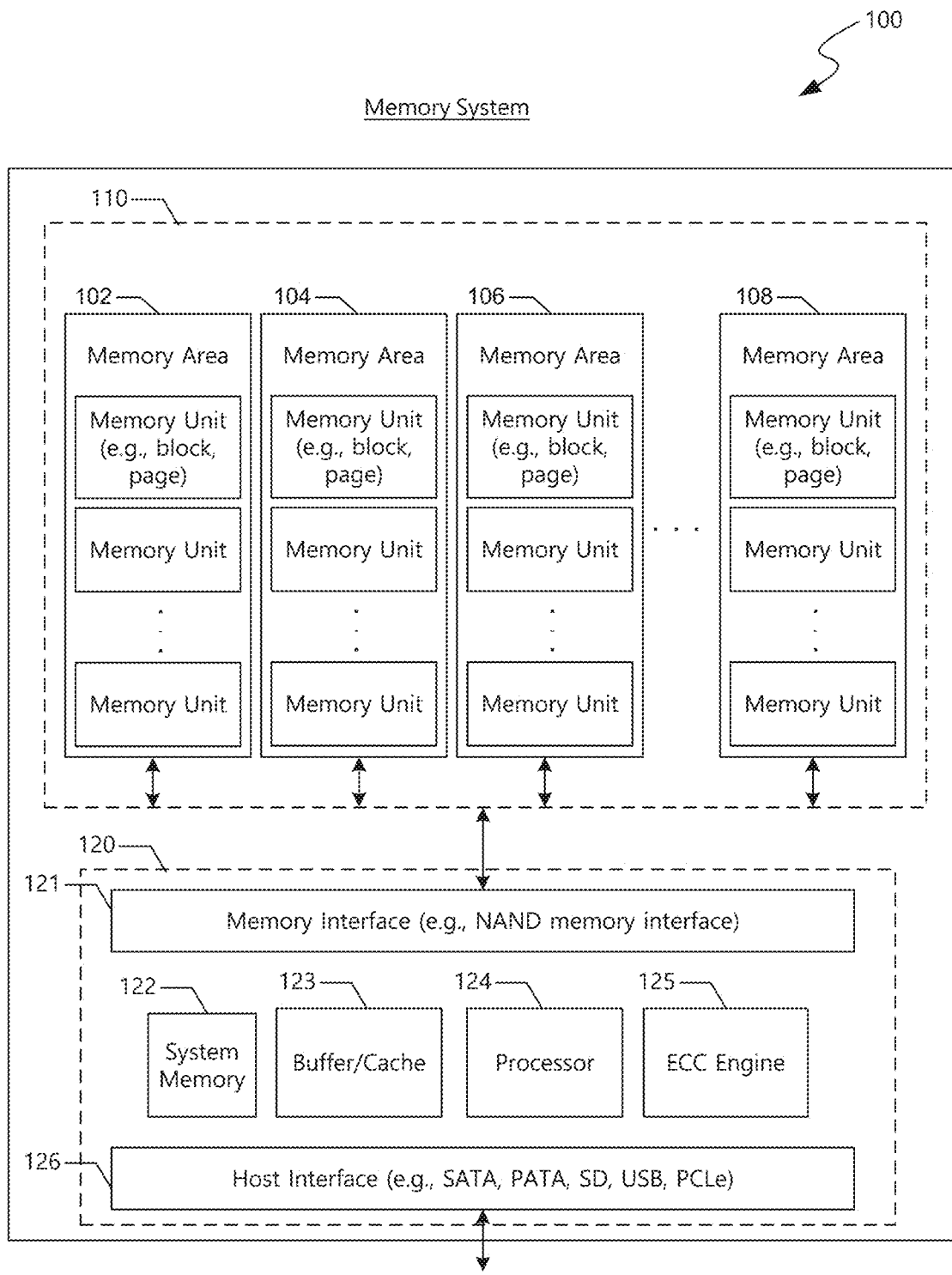
FIG. 1 illustrates an example of a memory system.

FIG. 1 is a block diagram of an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, and 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a block or a page that can be identified by a unique address such as a block address or a page address, respectively. For another example, wherein the memory areas 102, 104, 106, and 108 can include computer memories that include memory banks as a logical unit of data storage, the memory unit can be a bank that can be identified by a bank address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change random-access memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 102, 104, 106, and 108 can be configured to store at least one bit of information (e.g., one bit of information or multiple bits of information), and each of the memory cells in memory area 102, 104, 106, and 108 can be configured to store more than one bit of information.

As shown in FIG. 1, the memory system 100 includes a controller module 120. The controller module 120 includes a memory interface 121 to communicate with the memory module 110, a host interface 126 to communicate with a host (not shown), a processor 124 to execute firmware-level code, and caches and memories 123 and 122, respectively to temporarily or persistently store executable firmware/instructions and associated information. In some implementations, the controller unit 120 can include an error correction engine 125 to perform error correction operation on information stored in the memory module 110. Error correction engine 125 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

Figure 2:
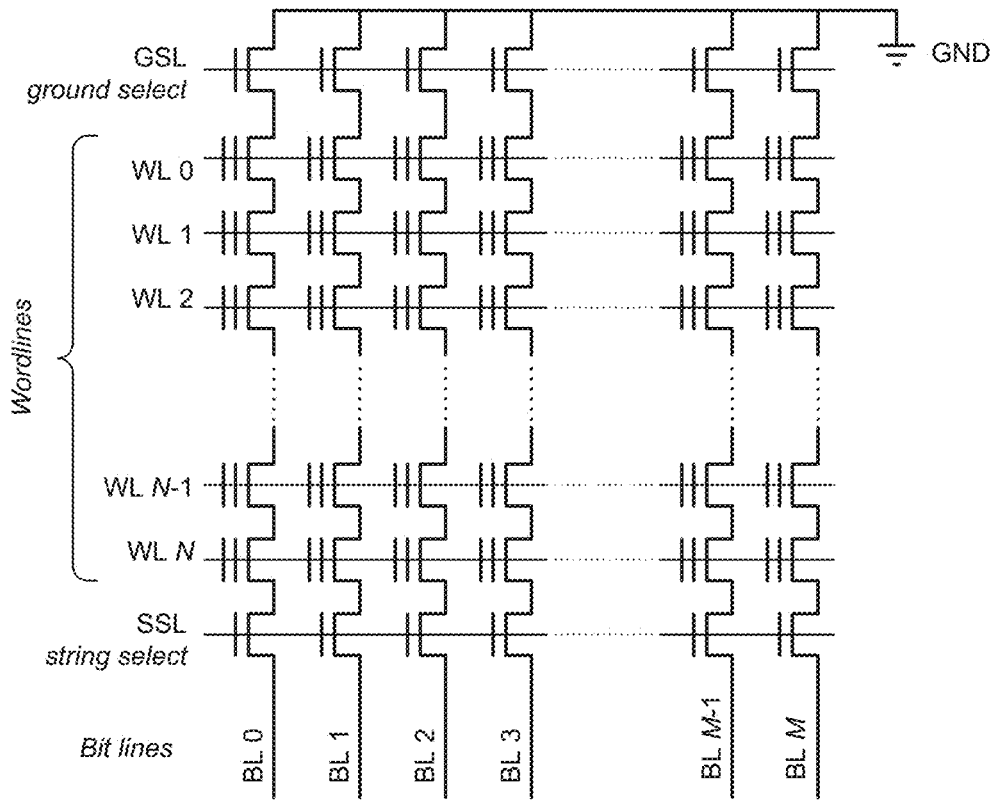
FIG. 2 is an illustration of an example non-volatile memory device.

FIG. 2 illustrates an example of a memory cell array implemented based on some embodiments of the disclosed technology.

In some implementations, the memory cell array can include NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

Figure 3:
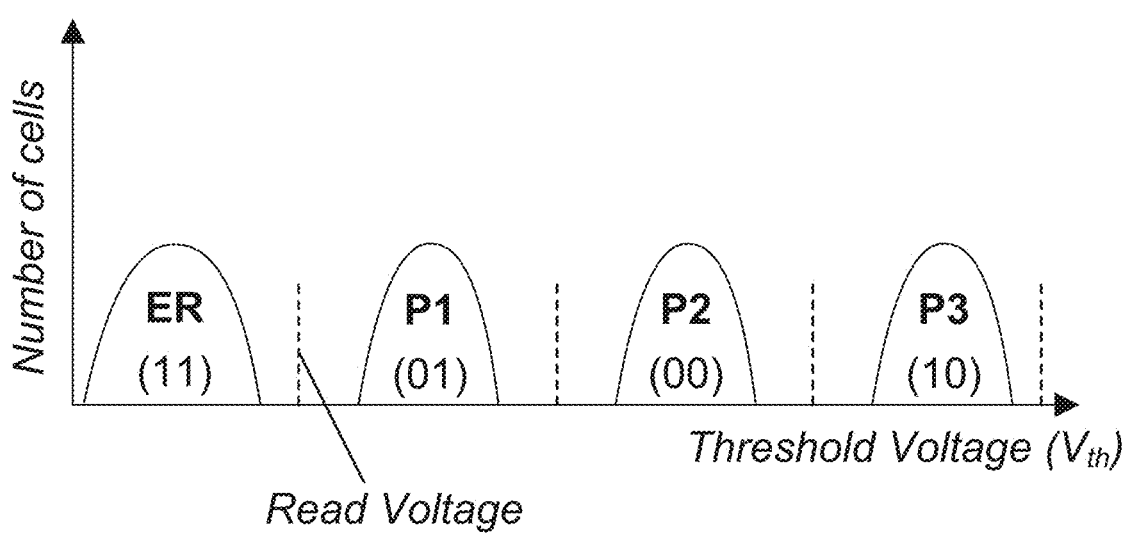
FIG. 3 is an example diagram illustrating the cell voltage level distribution ($V_{th}$) of a non-volatile memory device.

FIG. 3 illustrates an example of threshold voltage distribution curves in a multi-level cell device, wherein the number of cells for each program/erase state is plotted as a function of the threshold voltage. As illustrated therein, the threshold voltage distribution curves include the erase state (denoted "ER" and corresponding to "11") with the lowest threshold voltage, and three program states (denoted "P1", "P2" and "P3" corresponding to "01", "00" and "10", respectively) with read voltages in between the states (denoted by the dotted lines). In some embodiments, each of the threshold voltage distributions of program/erase states has a finite width because of differences in material properties across the memory array.

Although FIG. 3 shows a multi-level cell device by way of example, each of the memory cells can be configured to store any number of bits per cell. In some implementations, each of the memory cells can be configured as a single-level cell (SLC) to store one bit of information per cell, or as a triple-level cell (TLC) to store three bits of information per cell, or as a quad-level cells (QLC) to store four bits of information per cell.

In writing more than one data bit in a memory cell, fine placement of the threshold voltage levels of memory cells is needed because of the reduced distance between adjacent distributions. This is achieved by using incremental step pulse program (ISPP), i.e., memory cells on the same word-line are repeatedly programmed using a program-and-verify approach with a staircase program voltage applied to word-lines. Each programmed state associates with a verify voltage that is used in verify operations and sets the target position of each threshold voltage distribution window.

Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors, which will be discussed in the following, and such read errors may be managed in most situations by using error correction codes (ECCO).

Figure 4:
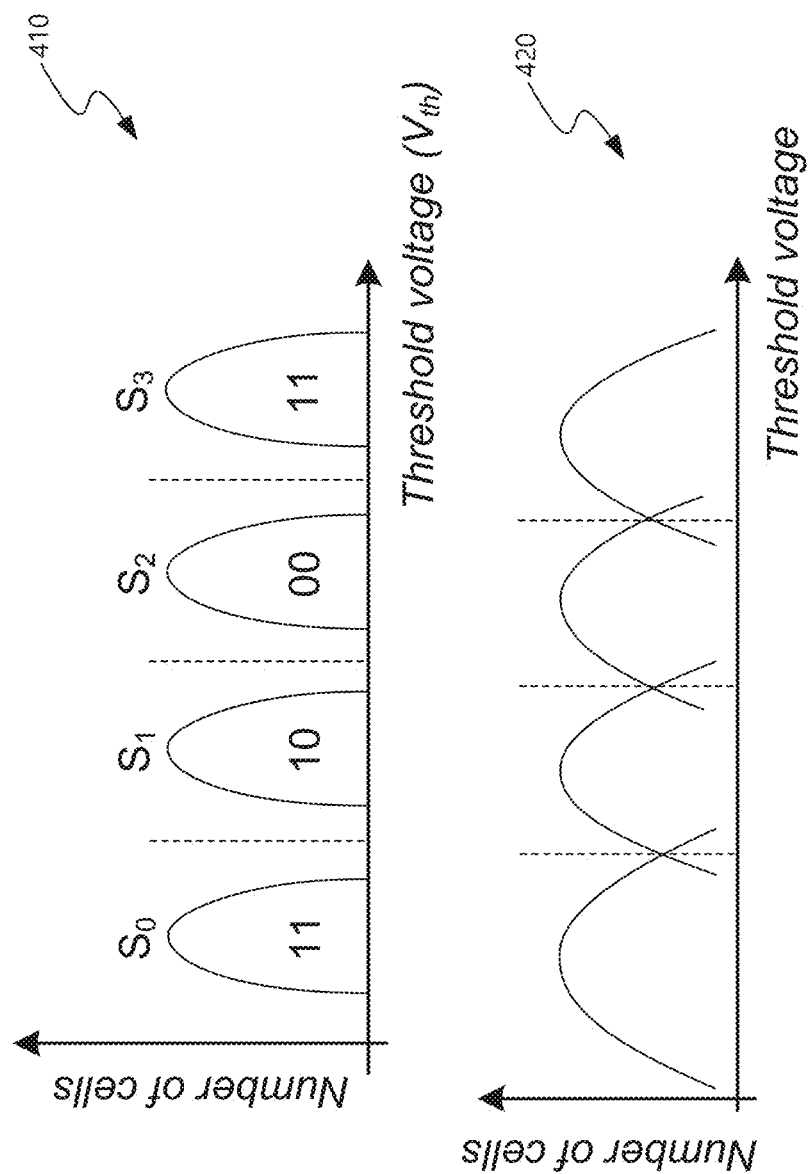
FIG. 4 is another example diagram illustrating the cell voltage level distribution ($V_{th}$) of a non-volatile memory device.

FIG. 4 illustrates an example of ideal threshold voltage distribution curves 410 and an example of distorted threshold voltage distribution curves 420. The vertical axis indicates the number of memory cells that has a particular threshold voltage represented on the horizontal axis.

For n-bit multi-level cell NAND flash memory, the threshold voltage of each cell can be programmed to $2^n$ possible values. In an ideal multi-level cell NAND flash memory, each value corresponds to a non-overlapping threshold voltage window.

Flash memory P/E cycling causes damage to a tunnel oxide of floating gate of a charge trapping layer of cell transistors, which results in threshold voltage shift and thus gradually degrades memory device noise margin. As P/E cycles increase, the margin between neighboring distributions of different programmed states decreases and eventually the distributions start overlapping. The data bit stored in a memory cell with a threshold voltage programmed in the overlapping range of the neighboring distributions may be misjudged as a value other than the original targeted value.

Figure 5:
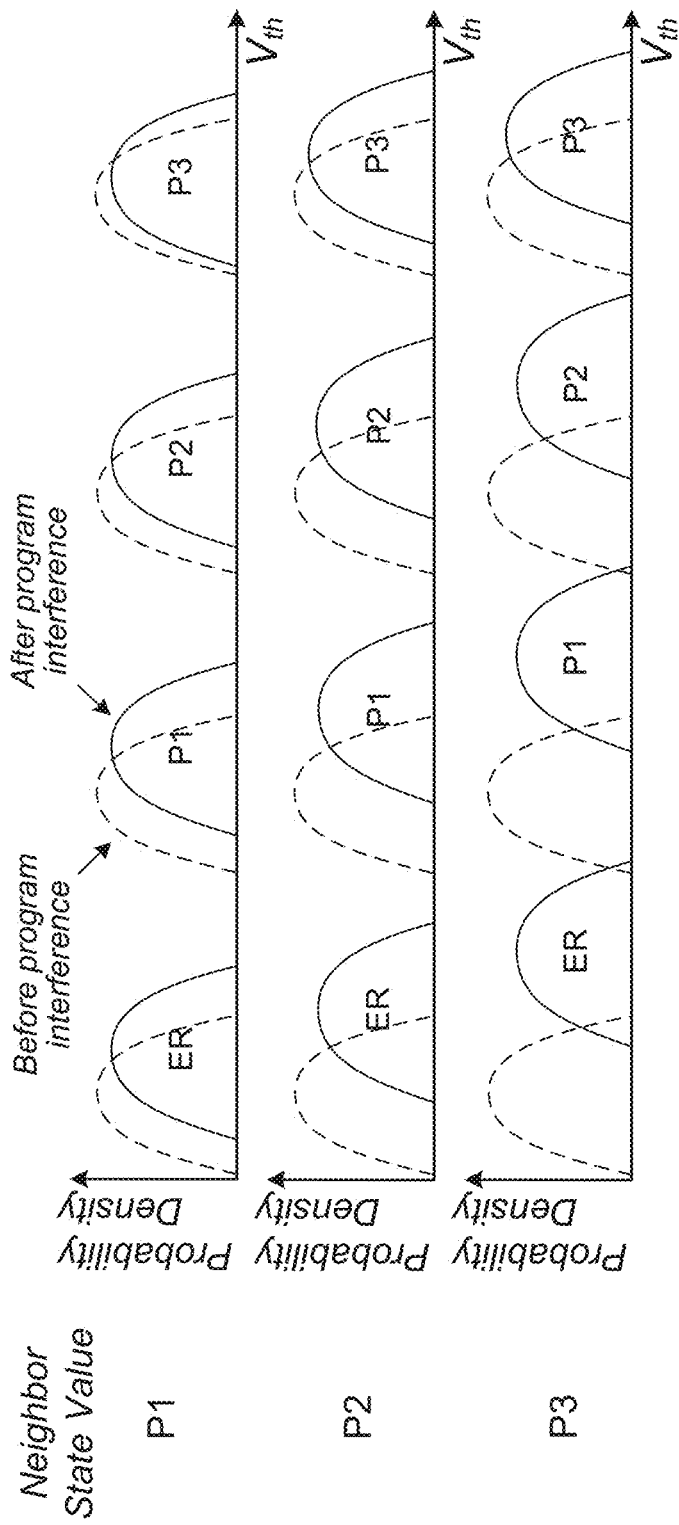
FIG. 5 is an example diagram illustrating the cell voltage level distribution ($V_{th}$) of a non-volatile memory device before and after program interference.

FIG. 5 illustrates an example of a cell-to-cell interference in NAND flash memory. The cell-to-cell interference can also cause threshold voltages of flash cells to be distorted. The threshold voltage shift of one memory cell transistor can influence the threshold voltage of its adjacent memory cell transistor through parasitic capacitance-coupling effect between the interfering cell and the victim cell. The amount of the cell-to-cell interference may be affected by NAND flash memory bit-line structure. In the even/odd bit-line structure, memory cells on one word-line are alternatively connected to even and odd bit-lines and even cells are programmed ahead of odd cells in the same word-line. Therefore, even cells and odd cells experience different amount of cell-to-cell interference. Cells in all-bit-line structure suffer less cell-to-cell interference than even cells in the even/odd bit-line structure, and the all-bit-line structure can effectively support high-speed current sensing to improve the memory read and verify speed.

The dotted lines in FIG. 5 denote the nominal distributions of P/E states (before program interference) of the cells under consideration, and the "neighbor state value" denotes the value that the neighboring state has been programmed to. As illustrated in FIG. 5, if the neighboring state is programmed to P1, the threshold voltage distributions of the cells under consideration shift by a specific amount. However, if the neighboring state is programmed to P2, which has a higher threshold voltage than P1, that results in a greater shift compared to the neighboring state being P1. Similarly, the shift in the threshold voltage distributions is greatest when the neighboring state is programmed to P3.

Figure 6:
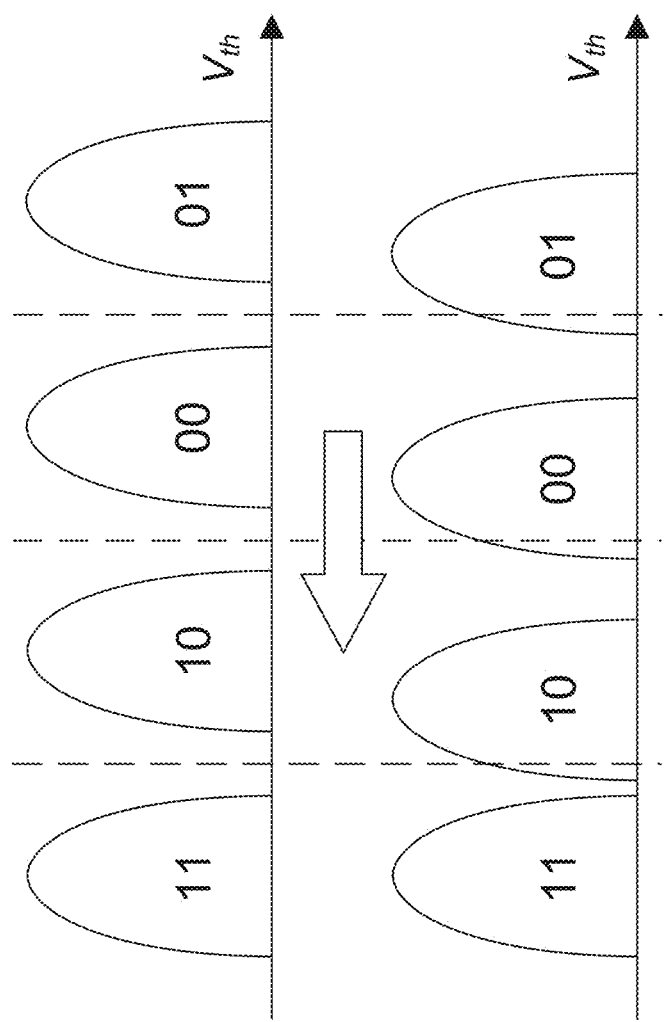
FIG. 6 is an example diagram illustrating the cell voltage level distribution ($V_{th}$) of a non-volatile memory device as a function of the reference voltage.

FIG. 6 illustrates an example of a retention error in NAND flash memory by comparing normal threshold-voltage distribution and shifted threshold-voltage distribution. The data stored in NAND flash memories tend to get corrupted over time and this is known as a data retention error. Retention errors are caused by loss of charge stored in the floating gate or charge trap layer of the cell transistor. Due to wear of the floating gate or charge trap layer, memory cells with more program erase cycles are more likely to experience retention errors. In the example of FIG. 6, comparing the top row of voltage distributions (before corruption) and the bottom row of distributions (contaminated by retention error) reveals a shift to the left.

In NAND-based storage systems (e.g., the examples illustrated in FIGS. 1-6), the threshold voltages can be estimated using a deep neural networks (DNNs). The threshold voltage is the cross-point of any two adjacent program-verify (PV) levels' threshold voltage distribution.

Figure 7:
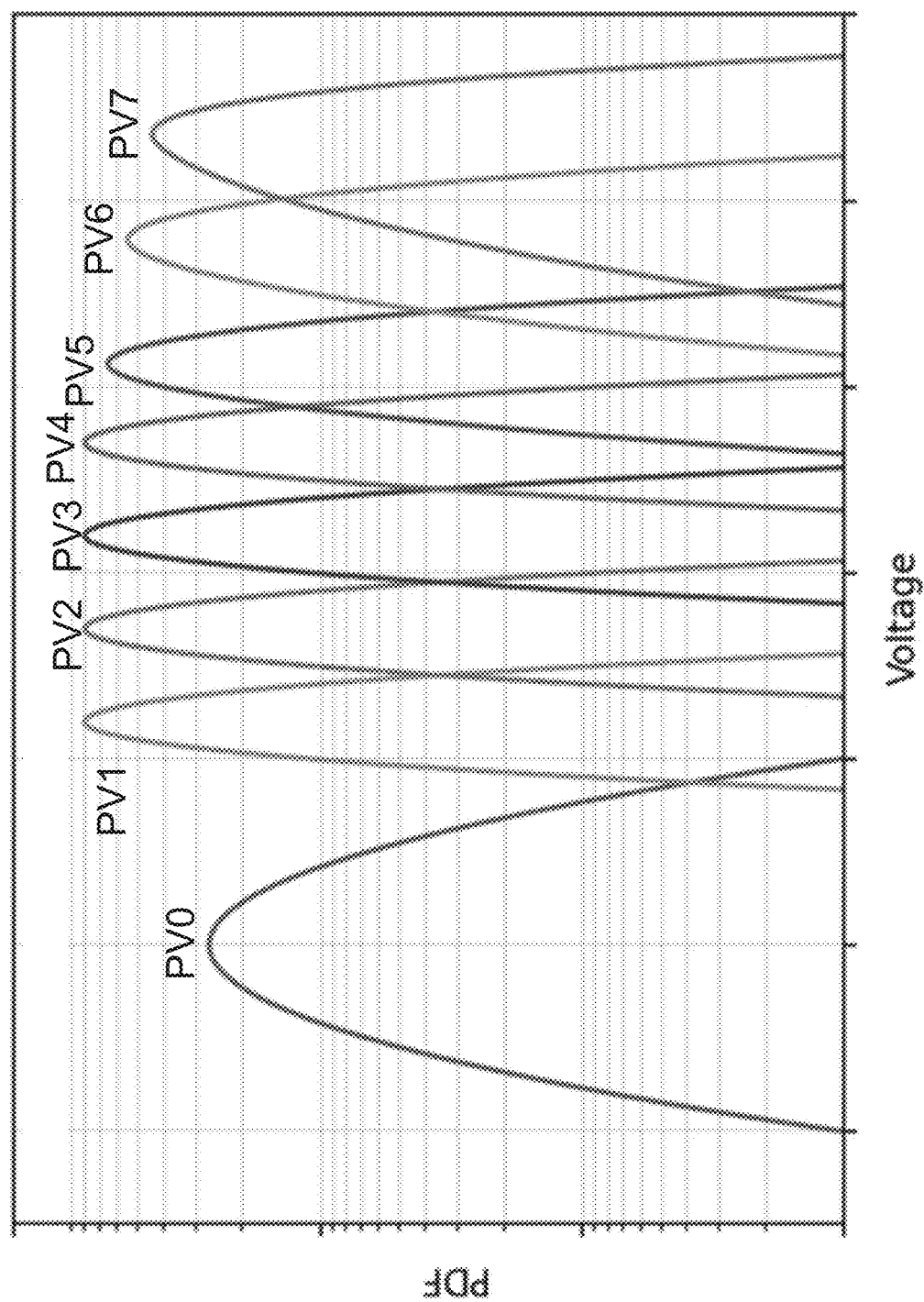
FIG. 7 illustrates an example of a theoretical voltage probability distributions for a triple level cell (TLC) NAND flash block.

FIG. 7 illustrates an example of a theoretical voltage probability distributions for a triple level cell (TLC) NAND flash block. As shown therein, the PV distributions for the eight TLC voltage distributions (denoted PV0, PV1, PV8 in FIG. 7) are not the same. Thus, to determine optimal read voltages for this TLC NAND flash block, the probability distributions (e.g., a probability density function (pdf) or a cumulative distribution function (CDF)) used to model each of the PV distributions, and the DNNs used to determine the parameters of the probability distribution should not be the same.

Figure 8:
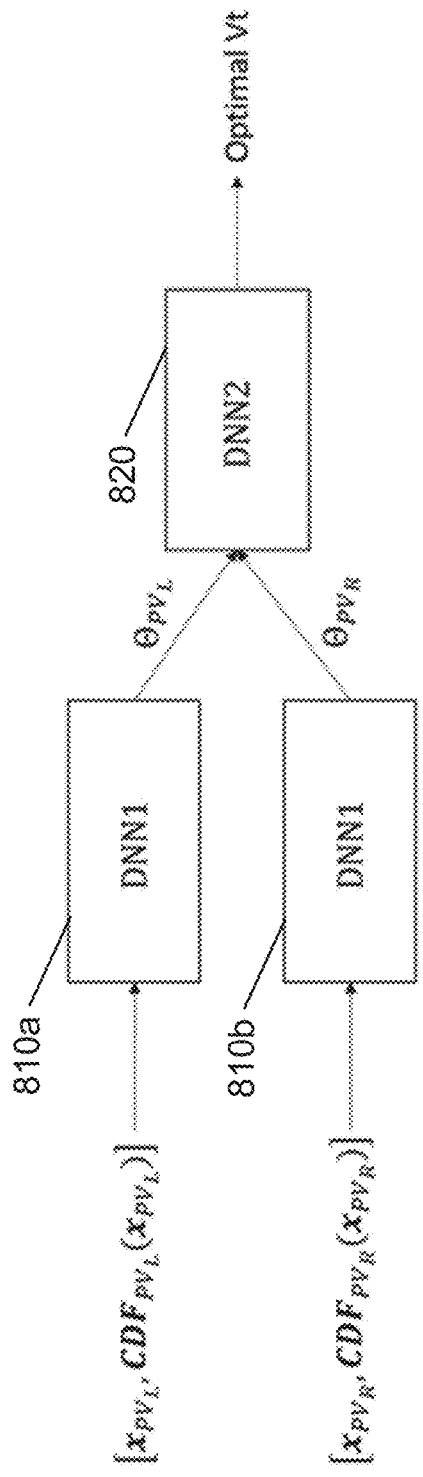
FIG. 8 is an example diagram illustrating the conventional architecture for deep neural networks (DNNs) being used to determine an optimized read voltage.

However, existing implementations, as illustrated in FIG. 8, use the same DNN for adjacent PV distributions. As shown therein, $PV_L$ and $PV_R$ are two adjacent PV levels, $x_{PV_L}$ is a list of sampling voltage values applied to $PV_L$, $CDF_{PV_L}(x_{PV_L})$ corresponds to $PV_L$'s cumulative density function (CDF) values of the threshold voltage distribution sampled at voltages in $x_{PV_L}$, $x_{PV_R}$ is a list of sampling voltage values applied to $PV_R$, $CDF_{PV_R}(x_{PV_R})$ corresponds to $PV_L$'s CDF values of the threshold voltage distribution sampled at voltages in $x_{PV_R}$, $\Theta_L$ is the set of parameters of $PV_L$, $\Theta_R$ is the set of parameters of $PV_R$, and "Optimal Vt" is the cross-point voltage between the threshold voltage distributions of $PV_L$ and $PV_R$.

That is, each of the DNNs are configured similarly and use the same weights to determine the parameters of the underlying probability distribution for that PV distribution. The estimated parameters from each of the set of first DNNs (810a and 810b) are input to a second DNN (820) that is configured to determine the optimal read voltage. Using the same DNN weights for each of the set of first DNNs typically results in the estimated read voltages being sub-optimal and less effective at accurately retrieving information from the memory device that is coupled to the first second of DNNs (810a and 810b) and the second DNN (820).

Continuing with the description of FIG. 8, the conventional implementation requires three components:

(1) a parametric distribution that models the distribution of the threshold voltage of cells for all PV levels. This parametric distribution is assumed to model the relationship between the sampling voltages, CDF samples and channel parameter Θ for each PV level;

(2) a set of first DNNs (810a and 810b, and denoted DNN1) that estimates the parameters of the distribution based on samples of the CDF given by NAND measurements. In an example, DNN1 is trained on a dataset that contains multiple sampling voltages x and the CDF values CDF(x) from the parametric distributions at the sampling voltages x. As shown in FIG. 8, the sampling voltages and the CDF values are input to DNN1, which is configured to output the distribution parameters Θ; and (3) a second DNN (820, and denoted DNN2) that predicts the optimal voltage threshold (Vt) based on the outputs of the set of first DNNs. In an example, DNN2 is trained on a dataset that contains parameters $\Theta_L$ and $\Theta_R$ as the input and is configured to output the optimal threshold voltage (Vt).

Instead of using the same probability distribution and DNN weights for all PV distributions, different probability distributions and different DNN weights may be used for each of the PV distributions to determine the optimal read voltages, but this approach may result in increased complexity, e.g., a quad level cell (QLC) NAND flash block that uses four bit layers per cell, would require sixteen DNNs to derive the parameters for all the QLC PV distributions.

Figure 9:
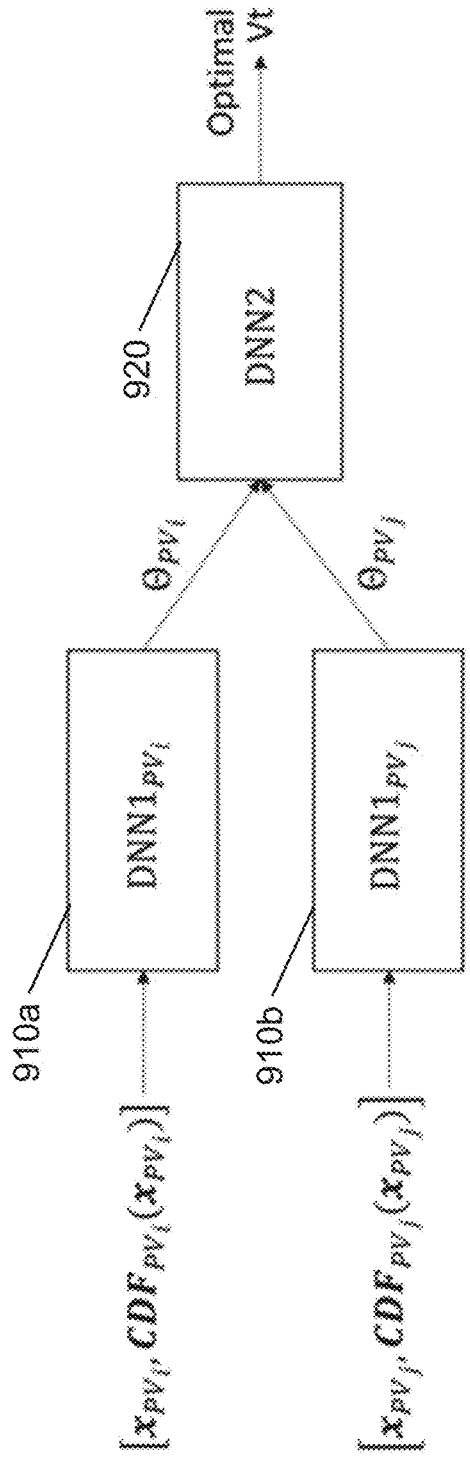
FIG. 9 is an example diagram illustrating a DNN architecture to determine an optimized read voltage, in accordance with the described embodiments.

Embodiments of the disclosed technology, e.g., as illustrated in FIG. 9, use a set of first DNNs that are PV-specific, i.e., the weights for each of the DNNs are different when the underlying probability distribution is different. To estimate the optimal read threshold of any two adjacent PVs, PV, and $PV_3$, the DNN1 that estimates $\Theta_{PV_i}$ is designed for PV1, which may be different from the DNN1 that estimates $\Theta_{PV_j}$. Herein, for the example of a TLC NAND flash block, $i \in \{0,1,2,3,4,5,6\}$ and $j=i+1$.

In the example illustrated in FIG. 7, the parameters of the PV distributions differ significantly. For example, if it is assumed that a skew-normal distribution is used (with parameters (ξ, ω, α)), the PV1 distribution has parameters $\Theta_{PV1}=[0.2, 0.1, 0]$, and the PV7 distribution has parameters $\Theta_{PV7}=[3.5, 0.3, -3]$. Thus, using the conventional implementation shown in FIG. 8, which assumes identical probability distributions and uses the same weights for each of the set of first DNNs, can lead to sub-optimal read voltages.

The described embodiments use different probability distributions and different DNN weights for different underlying cell voltage distributions. For example, different probability distributions and different weights may be used for PV0, PV5, PV6 and PV7, and yet another different probability distribution and yet another different DNN weights may be used for PV1, PV2, PV3 and PV4, since their PV distributions are fairly similar. Here, five probability distributions and DNNs can be used to determine the optimal read voltages for the TLC NAND flash block. Alternatively, a common probability distribution and DNN may be used for PV1, PV2, PV3, PV4 and PV5, which would reduce the number of DNNs required to four.

In this manner, embodiments of the disclosed technology advantageously provide a trade-off between complexity and performance. As discussed earlier, using different DNNs for each PV distribution may prohibitively increase implementation complexity, and may not provide a significantly performance benefit over using a fewer number of different DNNs, especially if a single DNN is used for cell voltage distributions that are very similar.

FIG. 9 illustrates the read-threshold estimation for two adjacent PV-levels, $PV_i$ and $PV_j$ (i∈{0,1,2,3,4,5,6}, j=i+1) whose cell-level distributions are modeled as skew-normal distributions with parameters $\Theta_{PV_i}=(\xi_{PV_i}, \omega_{PV_i}, \alpha_{PV_i})$ and $\Theta_{PV_j}=(\xi_{PV_j}, \omega_{PV_j}, \alpha_{PV_j})$ A skew-normal distribution has a pdf given by:

$$f(x; \Theta) = \frac{2}{\omega} \cdot \phi\left(\frac{x-\xi}{\omega}\right) \cdot \Phi\left(\alpha \cdot \frac{x-\xi}{\omega}\right).$$

wherein $$\phi(y) = \frac{1}{\sqrt{2\pi}} e^{-\frac{y^2}{2}}$$

and $\Phi(y) = \int_{-\infty}^{y} \phi(t)\, dt$ are the pdf and CDF of a normal (Gaussian) distribution, respectively.

Herein, the optimal read-threshold is x* is such that $f(x^*; \Theta_{PV_i}) = f(x^*; \Theta_{PV_j})$.

Figure 10:
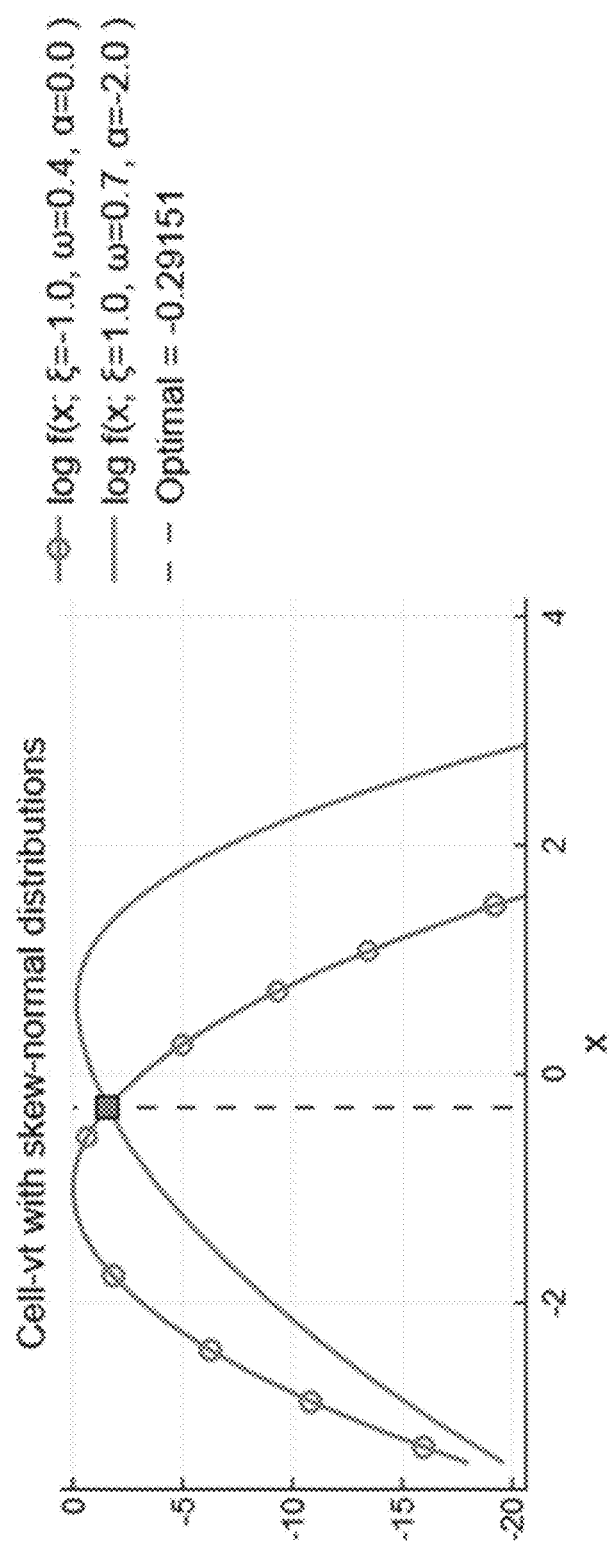
FIG. 10 illustrates an example of using probability density functions (PDFs) of skew-normal distributions to determine an optimized read voltage.

FIG. 10 illustrates an example of using probability density functions (PDFs) of skew-normal distributions to determine an optimal read voltage. As shown therein, the optimal read voltage is the cross-point of the two skew-normal distributions, each of whose parameters was determined using a DNN that has distinct weights.

In some embodiments, a differentiable loss function (e.g., mean square error) is defined to measure the error between the predicted and the actual distribution-parameters Θ, and a training algorithm such as stochastic gradient descent is used to optimize the weights of each of the first DNNs (910a and 910b). Similarly, a differentiable loss function is defined to measure the error between the optimal threshold voltage and the output of the second DNN (920), and a training algorithm such as stochastic gradient descent is used to obtain the weights of DNN2. In an example, the set of DNN1s and DNN2 are independently designed and trained on different datasets. In another example, they may be trained using the same set of samples.

Continuing the description of FIG. 9, the described embodiment for determining the optimal read voltage for adjacent PV distributions requires four components:

(1) a parametric distribution that models the distribution of the threshold voltage of cells for each of the adjacent PV levels. Each parametric distribution models the relationship between the sampling voltages, CDF samples and parameter Θ for the respective PV level;

(2) the $PV_i$-specific $DNN1_{PV_i}$ outputs $\Theta_{PV_i}$ from input $[x_{PV_i}, CDF_{PV_i}(x_{PV_i})]$, where $x_{PV_i}$ are the sampling voltage values applied to $PV_i$, and $CDF_{PV_i}(x_{PV_i})$ are $PV_i$'s CDF values of the threshold voltage distribution sampled at voltages in $x_{PV_i}$;

(3) the $PV_j$-specific $DNN1_{PV_j}$ outputs $\Theta_{PV_j}$ from input $[x_{PV_j}, CDF_{PV_j}(x_{PV_j})]$, where $x_{PV_j}$ are the sampling voltage values applied to $PV_j$, and $CDF_{PV_j}(x_{PV_j})$ are $PV_j$'s CDF values of the threshold voltage distribution sampled at voltages in $x_{PV_j}$; and (4) a PV-insensitive DNN2 is used to calculate the optimal Vt from $[\Theta_{PV_i}, \Theta_{PV_j}]$.

In some embodiments, for the $PV_i$-specific $DNN1_{PV_i}$ (910a), three reads (denoted read0, read1, and read2) are used to collect the input samples $$[x_{PV_i}, CDF_{PV_i}(x_{PV_i})] = [x_{PV_i}^{read0}, x_{PV_i}^{read1}, x_{PV_i}^{read2},$$
$$CDF_{PV_i}(x_{PV_i}^{read0}), CDF_{PV_i}(x_{PV_i}^{read1}), CDF_{PV_i}(x_{PV_i}^{read2})].$$

In some embodiments, the weights of the $PV_i$-specific $DNN1_{PV_i}$ may be in the form of multiple matrices $A_{DNN1,PV_i}^0, A_{DNN1,PV_i}^1, \ldots A_{DNN1,PV_i}^M$ and biases vectors $b_{DNN1,PV_i}^0, b_{DNN1,PV_i}^1, \ldots, b_{DNN1,PV_i}^M$, and the parameters of the underlying distribution can be calculated as $$\Theta_{PV_i} = A_{DNN1,PV_i}^M \times R\bigl(A_{DNN1,PV_i}^{M-1} \times$$
$$R\bigl(A_{DNN1,PV_i}^{M-2} \times R(\ldots R(A_{DNN1,PV_i}^0 \times [x_{PV_i}, CDF_{PV_i}(x_{PV_i})] + b_{DNN1,PV_i}^0)\ldots) +$$
$$b_{DNN1,PV_i}^{M-2} + b_{DNN1,PV_i}^{M-1}\bigr) + b_{DNN1,PV_i}^M.$$

Herein, R(•) represents an activation function. In an example, a rectified linear unit (ReLU) activation function may be used. In another example, a sigmoid function may be used.

Similarly, for $PV_j$-specific $DNN1_{PV_j}$ (910b), three reads (denoted read0, read1, and read2) are used to collect the input samples $$[x_{PV_j}, CDF_{PV_j}(x_{PV_j})] = [x_{PV_j}^{read0}, x_{PV_j}^{read1}, x_{PV_j}^{read2},$$
$$CDF_{PV_j}(x_{PV_j}^{read0}), CDF_{PV_j}(x_{PV_j}^{read1}), CDF_{PV_j}(x_{PV_j}^{read2})],$$

and the weights of $DNN1_{PV_j}$ may be in the form of multiple matrices $A_{DNN1,PV_j}^0, A_{DNN1,PV_j}^1, \ldots A_{DNN1,PV_j}^N$ and biases vectors $b_{DNN1,PV_j}^0, b_{DNN1,PV_j}^1, \ldots, b_{DNN1,PV_j}^N$ such that the parameters of the underlying distribution can be calculated as $$\Theta_{PV_j} = A_{DNN1,PV_j}^N \times R\bigl(A_{DNN1,PV_j}^{N-1} \times$$
$$R\bigl(A_{DNN1,PV_j}^{N-2} \times R(\ldots R(A_{DNN1,PV_j}^0 \times [x_{PV_j}, CDF_{PV_j}(x_{PV_j})] + b_{DNN1,PV_j}^0)\ldots) +$$
$$b_{DNN1,PV_j}^{N-2} + b_{DNN1,PV_j}^{N-1}\bigr) + b_{DNN1,PV_j}^N,$$

wherein R(•) represents an activation function.

In the above examples for $DNN1_{PV_i}$ and $DNN1_{PV_j}$, the sizes of the matrices A and vectors b, and the value of M (which represents the number of layers in the DNN), can be selected to trade-off complexity and performance.

In some embodiments, and with reference to FIG. 9, the input to DNN2 (920) is the concatenation of the output $\Theta_{PV_i}$ from $DNN1_{PV_i}$ and the output $\Theta_{PV_j}$ from $DNN1_{PV_j}$, which is given by:

$$[\Theta_{PV_i}, \Theta_{PV_j}] = [\xi_{PV_i}, \omega_{PV_i}, \alpha_{PV_i}, \xi_{PV_j}, \omega_{PV_j}, \alpha_{PV_j}].$$

The weights of DNN2 (920) may be in the form of multiple matrices $A_{DNN2}^0, A_{DNN2}^1, \ldots A_{DNN2}^Q$ and biases vectors $b_{DNN2}^0, b_{DNN2}^1, \ldots, b_{DNN2}^Q$, and the optimal read threshold is calculated as $$\text{Optimal } Vt = A_{DNN2}^Q \times$$
$$R\bigl(A_{DNN2}^{Q-1} \times R\bigl(A_{DNN2}^{Q-2} \times R(\ldots r(A_{DNN2}^0 \times [\Theta_{PV_i}, \Theta_{PV_j}] + b_{DNN2}^0)\ldots) + b_{DNN2}^{Q-2}\bigr) +$$
$$b_{DNN2}^{Q-1}\bigr) + b_{DNN2}^Q.$$

Herein, R(•) represents an activation function. In an example, a rectified linear unit (ReLU) activation function may be used. In another example, a sigmoid function may be used.

In some embodiments, the parametric distribution may be a skew-normal distribution. However, if the underlying cell voltage distributions do not conform with a skew-normal distribution, a different distribution can be used to determine more accurate read voltages. For example, the parametric distribution may be a Gaussian distribution and the parameters output by each of the first DNNs (e.g., 910a and 910b in FIG. 9) can be means and variances.

In some embodiments, multiple PV distributions may share a single first DNN. As previously discussed in the context of FIG. 7, a single DNN1 is used to determine the parameters of a common underlying distribution that is used to model PV1, PV2, PV3 and PV4. In this case, samples from each of these distributions can be initially used to train the corresponding DNN, and subsequently to estimate the parameters to determine the optimal read voltage.

In some embodiments, the samples of the PV distributions may be compared in a pairwise manner to determine whether the two distributions could be represented by a common DNN1. This determination may be made by computing a metric for the two distributions and comparing it to a threshold. In an example, the metric is based on the Fisher information metric computed for the two distributions. In another example, the metric is based on the Kullback-Leibler divergence or the Jensen-Shannon divergence computed for the two distributions. In yet other examples, other metrics that measure the similarity between two probability distributions may be used to determine whether two (or more) distributions should share a DNN1.

The threshold that the metric is compared to may be selected based on the trade-off between complexity and performance. For example, if a low complexity implementation is preferred, the threshold can be selected to allow slightly differing PV distributions to share a DNN1, which would adversely impact performance but remain low complexity. Alternatively, the threshold can be selected to only enable substantially identical PV distributions to share a DNN1, which would result in better performance, but higher complexity.

Figure 11A:
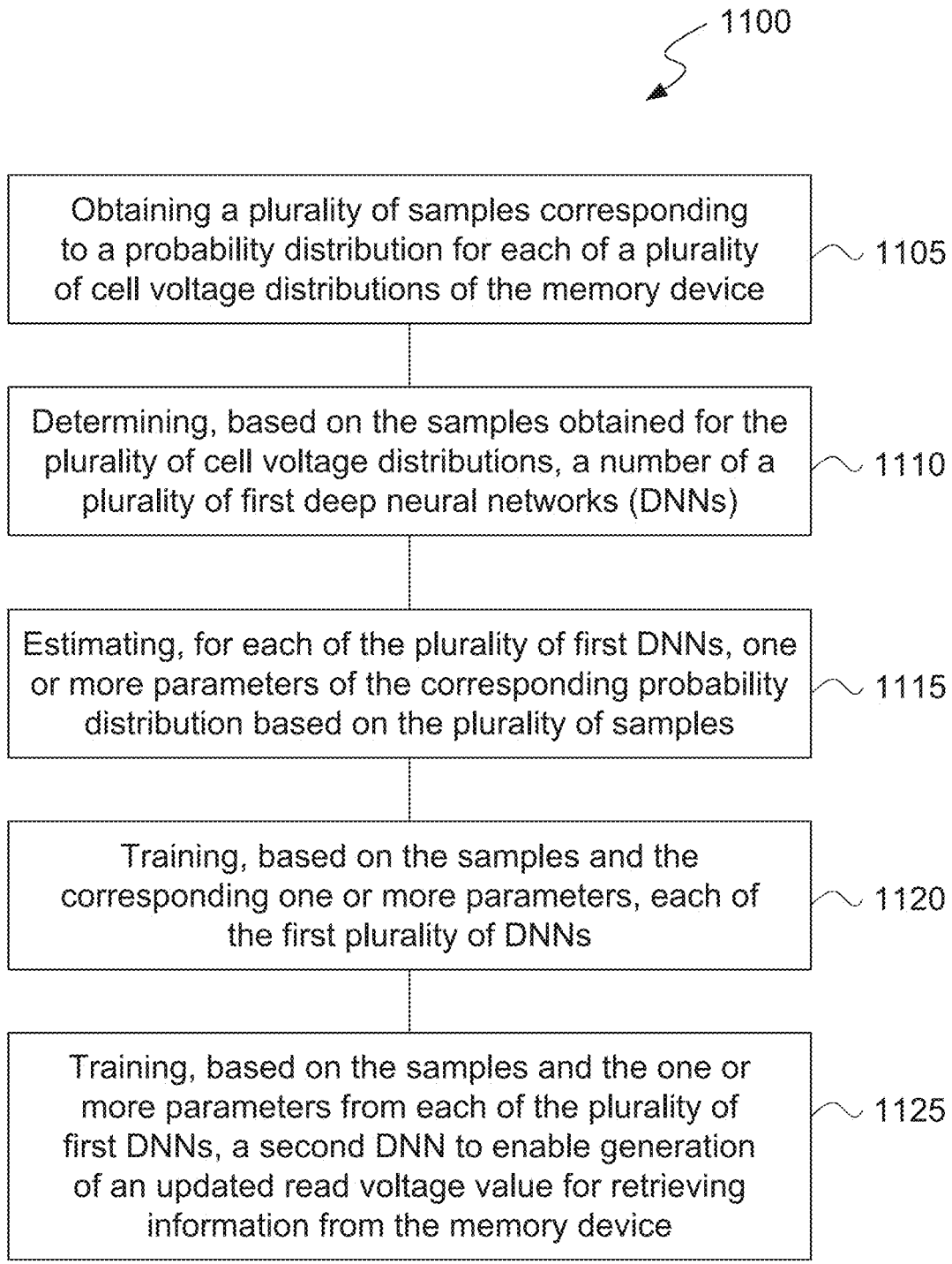
FIGS. 11A and 11B illustrate flowcharts of example methods for improving performance of a memory device.

FIG. 11A illustrates a flowchart of an example method 1100 for improving performance of a memory device. The method 1100 includes, at operation 1105, obtaining a plurality of samples corresponding to a probability distribution for each of a plurality of cell voltage distributions of the memory device, wherein each of the plurality of cell voltage distributions corresponds to a read voltage.

The method 1100 includes, at operation 1110, determining, based on the samples obtained for the plurality of cell voltage distributions, a number of a plurality of first deep neural networks (DNNs).

The method 1100 includes, at operation 1115, estimating, for each of the plurality of first DNNs, one or more parameters of the corresponding probability distribution based on the plurality of samples.

The method 1100 includes, at operation 1120, training, based on the samples and the corresponding one or more parameters, each of the plurality of first DNNs.

The method 1100 includes, at operation 1125, training, based on the samples and the one or more parameters from each of the plurality of first DNNs, a second DNN to enable generation of an updated read voltage value for retrieving information from the memory device.

Figure 12:
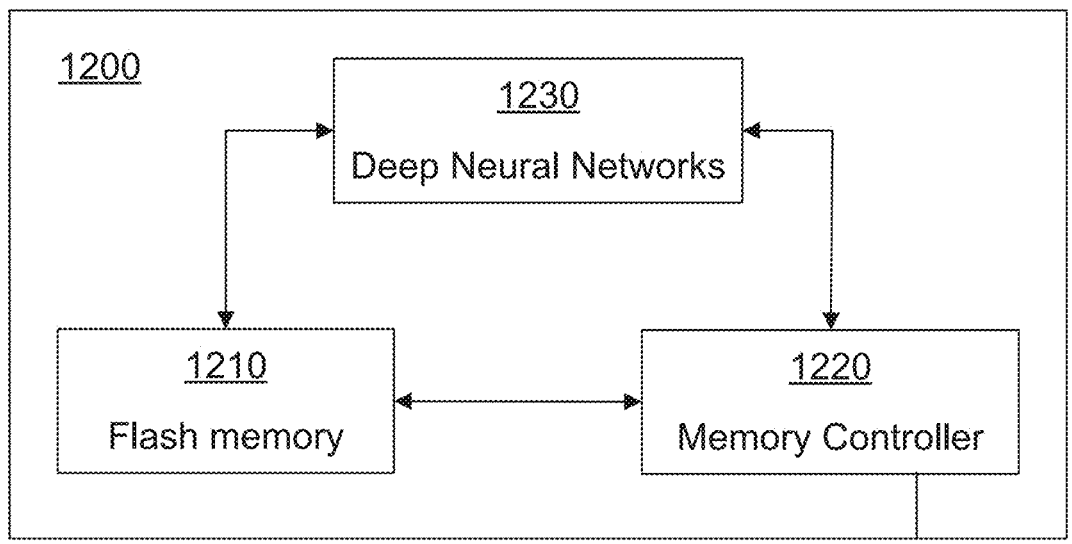
FIG. 12 is an example diagram illustrating a storage device that can be configured to implement the described embodiments.

In some embodiments, operations 1105 to 1125 can be performed by a memory controller (e.g., memory controller 1220 in FIG. 12), and the updated plurality of read voltages can be estimated using DNNs (e.g., the deep neural networks 1230 in FIG. 12).

In some embodiments, determining the number of the plurality of first DNNs comprises performing, for each pair of probability distributions, a comparison between the corresponding plurality of samples to generate a metric indicative of a distance between the pair of probability distributions, and determining, based on the metric, the number of the plurality of first DNNs.

In some embodiments, the metric is based on a Fisher information metric.

In some embodiments, the metric is based on a Kullback-Leibler divergence or a Jensen-Shannon divergence.

In some embodiments, estimating the one or more parameters of the probability distribution comprises measuring an error between actual values of the one or more parameters and predicted values of the one or more parameters.

In some embodiments, the error is a mean square error.

In some embodiments, the method 1100 further includes the operation of using a stochastic gradient descent algorithm, based on the corresponding error, to determine one or more weights of the corresponding first DNN.

Embodiments of the disclosed include an apparatus for improving performance of a memory device. The apparatus includes a memory controller, a plurality of first deep neural networks (DNNs), each first DNN being communicatively coupled to the memory controller, and a second DNN comprising a plurality of inputs, each input being coupled to an output of a corresponding first DNN, and an output coupled to the memory controller, wherein the memory controller is configured to obtain a plurality of samples corresponding to a probability distribution for each of a plurality of cell voltage distributions of the memory device, wherein each of the plurality of cell voltage distributions corresponds to a read voltage, determine, based on the samples obtained for the plurality of cell voltage distributions, a number of a plurality of first deep neural networks (DNNs), estimate, for each of the plurality of first DNNs, one or more parameters of the corresponding probability distribution based on the plurality of samples, train, based on the samples and the corresponding one or more parameters, each of the plurality of first DNNs, and train, based on the samples and the one or more parameters from each of the plurality of first DNNs, a second DNN to enable generation of an updated read voltage value for retrieving information from the memory device.

Figure 11B:
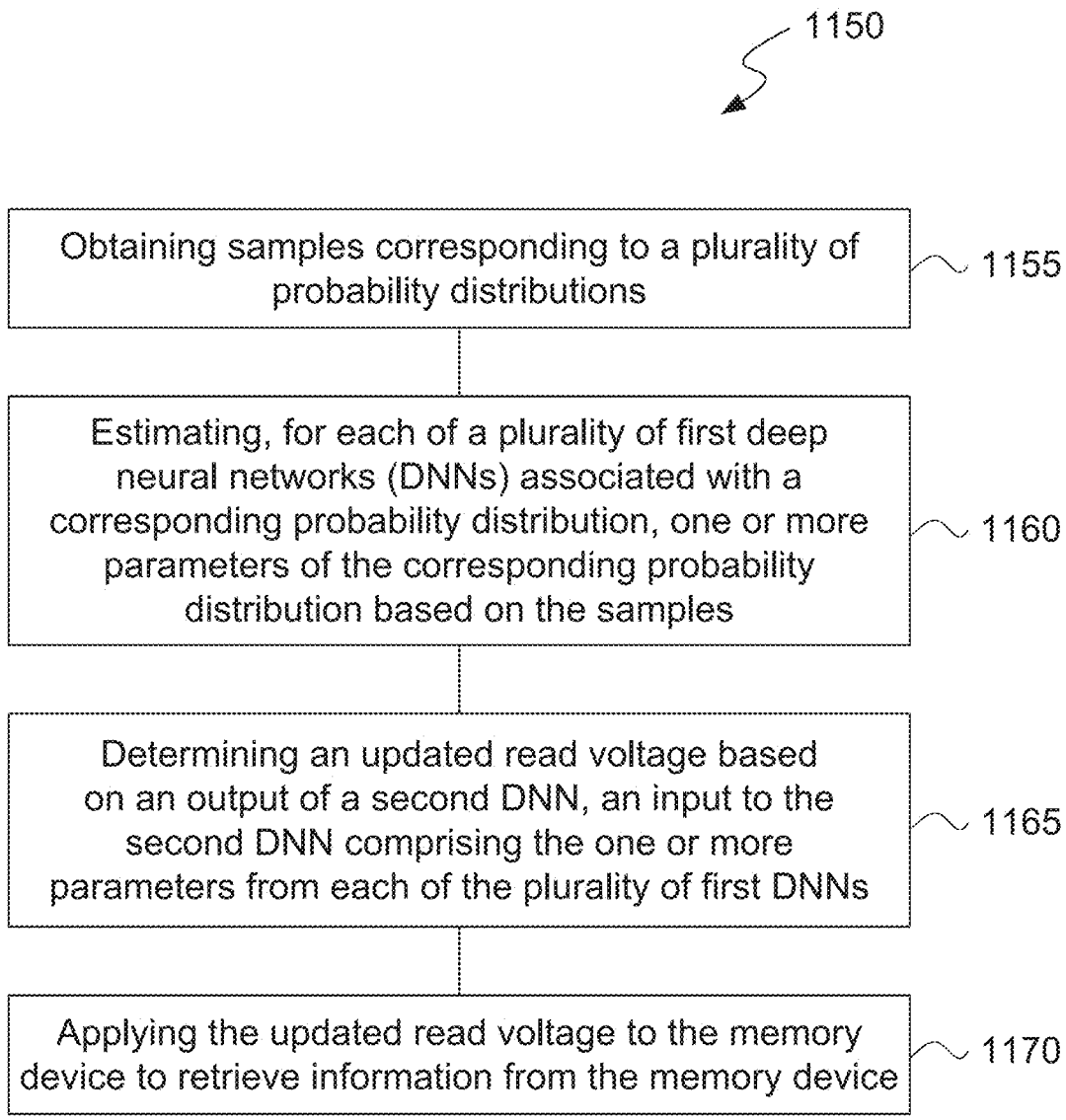

FIG. 11B illustrates a flowchart of a method 1150 for improving performance of a memory device. The method 1150 includes, at operation 1155, obtaining samples corresponding to a plurality of probability distributions, wherein each of the plurality of probability distributions is associated with each of a plurality of cell voltage distributions of the memory device, and wherein each of the plurality of cell voltage distributions corresponds to a read voltage.

The method 1150 includes, at operation 1160, estimating, for each of a plurality of first deep neural networks (DNNs) associated with a corresponding probability distribution, one or more parameters of the corresponding probability distribution based on the samples, each of the first DNNs having been trained using the samples obtained from the corresponding probability distribution.

The method 1150 includes, at operation 1165, determining an updated read voltage based on an output of a second DNN, an input to the second DNN comprising the one or more parameters from each of the plurality of first DNNs, and the second DNN having been trained using the samples and the one or more parameters from each of the plurality of first DNNs.

The method 1150 includes, at operation 1170, applying the updated read voltage to the memory device to retrieve information from the memory device.

In some embodiments, operations 1155, 1160 and 1165 can be performed by a memory controller (e.g., memory controller 1220 in FIG. 12), operation 1170 can be performed by a memory device or the memory controller (e.g., flash memory 1210 and memory controller 1220, respectively, in FIG. 12), and the updated plurality of read voltages are estimated using DNNs (e.g., the deep neural networks 1230 in FIG. 12).

In some embodiments, the samples correspond to cumulative distribution functions associated with the plurality of cell voltage distributions.

In some embodiments, the probability distribution is a skew-normal distribution.

In some embodiments, the probability distribution is a Gaussian distribution.

In some embodiments, the memory device is a triple level cell (TLC) NAND flash memory device.

Embodiments of the disclosed include an apparatus for improving performance of a memory device. The apparatus includes a memory controller, a plurality of first deep neural networks (DNNs), each first DNN being communicatively coupled to the memory controller, and a second DNN comprising a plurality of inputs, each input being coupled to an output of a corresponding first DNN, and an output coupled to the memory controller, wherein the memory controller is configured to obtain samples corresponding to a plurality of probability distributions, wherein each of the plurality of probability distributions is associated with each of a plurality of cell voltage distributions of the memory device, and wherein each of the plurality of cell voltage distributions corresponds to a read voltage, estimate, for each of a plurality of first deep neural networks (DNNs) associated with a corresponding probability distribution, one or more parameters of the corresponding probability distribution based on the samples, each of the first DNNs having been trained using the samples obtained from the corresponding probability distribution, determine an updated read voltage based on an output of a second DNN, an input to the second DNN comprising the one or more parameters from each of the plurality of first DNNs, and the second DNN having been trained using the samples and the one or more parameters from each of the plurality of first DNNs, and apply the updated read voltage to the memory device to retrieve information from the memory device.

FIG. 12 is an example diagram illustrating a storage device that can be configured to implement the described embodiments. Referring to FIG. 12, a data storage device 1200 may include a flash memory 1210, a memory controller 1220, and deep neural networks (DNNs) 1230. The memory controller 1220 may control the flash memory 1210 and the DNN 1230 in response to control signals input from the outside of the data storage device 1200. In the data storage device 1200, the flash memory 1210 may be configured the same or substantially the same as a nonvolatile memory device. That is, the flash memory 1210 may read data from selected memory cells using different read voltages to output it to the memory controller 1220. The different read voltages may be estimated using the DNN 1230 based on the embodiments described in this document. In an example, DNNs 1230 may be the DNNs illustrated in FIG. 9.

In some embodiments, the data storage device 1200 may be a memory card device, an SSD device, a multimedia card device, an SD card, a memory stick device, an HDD device, a hybrid drive device, or an USB flash device. For example, the data storage device 1200 may be a card which satisfies the standard for user devices such as a digital camera, a personal computer, and so on.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for improving performance of a memory device, comprising:
   obtaining a plurality of samples corresponding to a probability distribution for each of a plurality of cell voltage distributions of the memory device, wherein each of the plurality of cell voltage distributions corresponds to a read voltage;
   determining, based on the samples obtained for the plurality of cell voltage distributions, a number of a plurality of first deep neural networks (DNNs);
   estimating, for each of the plurality of first DNNs, one or more parameters of the corresponding probability distribution based on the plurality of samples;
   training, based on the samples and the corresponding one or more parameters, each of the plurality of first DNNs; and
   training, based on the samples and the one or more parameters from each of the plurality of first DNNs, a second DNN to enable generation of an updated read voltage value for retrieving information from the memory device.

2. The method of claim 1, wherein determining the number of the plurality of first DNNs comprises:
   performing, for each pair of probability distributions, a comparison between the corresponding plurality of samples to generate a metric indicative of a distance between the pair of probability distributions; and
   determining, based on the metric, the number of the plurality of first DNNs.

3. The method of claim 2, wherein the metric is based on a Fisher information metric.

4. The method of claim 2, wherein the metric is based on a Kullback-Leibler divergence or a Jensen-Shannon divergence.

5. The method of claim 1, wherein estimating the one or more parameters of the probability distribution comprises:
   measuring an error between actual values of the one or more parameters and predicted values of the one or more parameters.

6. The method of claim 5, wherein the error is a mean square error.

7. The method of claim 5, further comprising:
   using a stochastic gradient descent algorithm, based on the corresponding error, to determine one or more weights of the corresponding first DNN.

8. A method for improving performance of a memory device, comprising:
   obtaining samples corresponding to a plurality of probability distributions, wherein each of the plurality of probability distributions is associated with each of a plurality of cell voltage distributions of the memory device, and wherein each of the plurality of cell voltage distributions corresponds to a read voltage;
   estimating, for each of a plurality of first deep neural networks (DNNs) associated with a corresponding probability distribution, one or more parameters of the corresponding probability distribution based on the samples, each of the first DNNs having been trained using the samples obtained from the corresponding probability distribution;
   determining an updated read voltage based on an output of a second DNN, an input to the second DNN comprising the one or more parameters from each of the plurality of first DNNs, and the second DNN having been trained using the samples and the one or more parameters from each of the plurality of first DNNs; and
   applying the updated read voltage to the memory device to retrieve information from the memory device.

9. The method of claim 8, wherein the samples correspond to cumulative distribution functions associated with the plurality of cell voltage distributions.

10. The method of claim 8, wherein the probability distribution is a skew-normal distribution.

11. The method of claim 10, wherein a probability density function $f(x)$ of the skew-normal distribution is given by:

$$f(x; \Theta) = \frac{2}{\omega} \cdot \phi\left(\frac{x-\xi}{\omega}\right) \cdot \Phi\left(\alpha \cdot \frac{x-\xi}{\omega}\right).$$

wherein $\Theta = (\xi, \omega, \alpha)$ corresponds to the one or more parameters, and wherein $$\phi(y) = \frac{1}{\sqrt{2\pi}} e^{-\frac{y^2}{2}}$$

and $\Phi(y) = \int_{-\infty}^{y} \phi(t)\, dt$.

12. The method of claim 8, wherein the probability distribution is a Gaussian distribution.

13. The method of claim 8, wherein the memory device is a triple level cell (TLC) NAND flash memory device.

14. An apparatus for improving performance of a memory device, comprising:
  a memory controller;
  a plurality of first deep neural networks (DNNs), each first DNN being communicatively coupled to the memory controller; and
  a second DNN comprising a plurality of inputs, each input being coupled to an output of a corresponding first DNN, and an output coupled to the memory controller,
  wherein the memory controller is configured to:
    obtain a plurality of samples corresponding to a probability distribution for each of a plurality of cell voltage distributions of the memory device, wherein each of the plurality of cell voltage distributions corresponds to a read voltage;
    determine, based on the samples obtained for the plurality of cell voltage distributions, a number of a plurality of first deep neural networks (DNNs);
    estimate, for each of the plurality of first DNNs, one or more parameters of the corresponding probability distribution based on the plurality of samples;
    train, based on the samples and the corresponding one or more parameters, each of the plurality of first DNNs; and
    train, based on the samples and the one or more parameters from each of the plurality of first DNNs, a second DNN to enable generation of an updated read voltage value for retrieving information from the memory device.

15. The apparatus of claim 14, wherein the memory controller is further configured, as part of determining the number of the plurality of first DNNs, to:
  perform, for each pair of probability distributions, a comparison between the corresponding plurality of samples to generate a metric indicative of a distance between the pair of probability distributions; and
  determine, based on the metric, the number of the plurality of first DNNs.

16. The apparatus of claim 15, wherein the metric is based on a Fisher information metric, a Kullback-Leibler divergence, or a Jensen-Shannon divergence.

17. An apparatus for improving performance of a memory device, comprising:
  a memory controller;
  a plurality of first deep neural networks (DNNs), each first DNN being communicatively coupled to the memory controller; and
  a second DNN comprising a plurality of inputs, each input being coupled to an output of a corresponding first DNN, and an output coupled to the memory controller,
  wherein the memory controller is configured to:
    obtain samples corresponding to a plurality of probability distributions, wherein each of the plurality of probability distributions is associated with each of a plurality of cell voltage distributions of the memory device, and wherein each of the plurality of cell voltage distributions corresponds to a read voltage;
    estimate, for each of a plurality of first deep neural networks (DNNs) associated with a corresponding probability distribution, one or more parameters of the corresponding probability distribution based on the samples, each of the first DNNs having been trained using the samples obtained from the corresponding probability distribution;
    determine an updated read voltage based on an output of a second DNN, an input to the second DNN comprising the one or more parameters from each of the plurality of first DNNs, and the second DNN having been trained using the samples and the one or more parameters from each of the plurality of first DNNs; and
    apply the updated read voltage to the memory device to retrieve information from the memory device.

18. The apparatus of claim 17, wherein the samples correspond to cumulative distribution functions associated with the plurality of cell voltage distributions.

19. The apparatus of claim 17, wherein the probability distribution is a skew-normal distribution or a Gaussian distribution.

20. The apparatus of claim 17, wherein the memory device is a triple level cell (TLC) NAND flash memory device.

* * * * *